United States Patent
St. Jacques, Jr. et al.

(10) Patent No.: US 8,264,702 B2
(45) Date of Patent: Sep. 11, 2012

(54) METHOD AND SYSTEM FOR DETERMINING ROOT CAUSE OF PROBLEMS IN MEMBERS OF A FLEET OF MULTI-FUNCTION DEVICES

(75) Inventors: Robert J. St. Jacques, Jr., Fairport, NY (US); Tracy Eugene Thieret, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 488 days.

(21) Appl. No.: 12/631,533

(22) Filed: Dec. 4, 2009

(65) Prior Publication Data

US 2011/0134451 A1 Jun. 9, 2011

(51) Int. Cl.
*G06F 15/00* (2006.01)
*G06K 1/00* (2006.01)
(52) U.S. Cl. ..................... 358/1.13; 358/1.15
(58) Field of Classification Search .................. None
See application file for complete search history.

(56) References Cited

U.S. PATENT DOCUMENTS

| | | | |
|---|---|---|---|
| 6,687,693 B2 | 2/2004 | Cereghini et al. | 707/6 |
| 6,865,582 B2 | 3/2005 | Obradovic et al. | 707/104.1 |
| 2004/0111315 A1 | 6/2004 | Sharma et al. | 705/11 |
| 2004/0128375 A1 | 7/2004 | Rockwell | 709/223 |
| 2004/0128669 A1 | 7/2004 | Furst et al. | 717/178 |
| 2007/0100851 A1 | 5/2007 | Golovchinsky et al. | 707/100 |
| 2007/0150498 A1 | 6/2007 | Li et al. | 707/101 |
| 2007/0260716 A1 | 11/2007 | Gnanasambandam et al. | 709/223 |
| 2009/0228950 A1 | 9/2009 | Reed et al. | 726/1 |
| 2009/0228967 A1 | 9/2009 | Gbadegesin et al. | 726/8 |
| 2009/0276771 A1 | 11/2009 | Nickolov et al. | 717/177 |

*Primary Examiner* — Thierry Pham
(74) *Attorney, Agent, or Firm* — Kermit D. Lopez; Luis M. Ortiz; Kevin Soules

(57) ABSTRACT

A distributed data mining system and method for determining root cause of problems associated with a MFD cloud. The MFD cloud may be configured to include a fleet of networked MFDs within an enterprise firewall to perform data analytics in real time. High frequency data with describing the state of each MFD can be captured and stored locally in a file system (distributed or not). The high frequency data may be acquired at regular intervals and/or in response to a specific event with a much higher cadence and finer granularity than currently practiced. A distributed data mining module associated with the enterprise firewall may then continuously analyze the data stored within the cloud to identify actual, pending or, difficult to detect problems based on available computational cycles of idle MFDs in the network. The data associated with the problems may then be securely transmitted to a back-end unit to verify and propagate the results of the analysis of the problems more rapidly.

19 Claims, 4 Drawing Sheets

METHOD AND SYSTEM FOR DETERMINING ROOT CAUSE OF PROBLEMS IN MEMBERS OF A FLEET OF MULTI-FUNCTION DEVICES

TECHNICAL FIELD

Embodiments are generally related to multi-function devices such as, printers, scanners, photocopy machines, and the like. Embodiments are also related to data mining systems and techniques. Embodiments are additionally related to methods for determining the root cause of problems in members of a fleet of multi-function devices.

BACKGROUND OF THE INVENTION

A MFD (Multi-Function Device) is a rendering device or office machine, which incorporates the functionality of multiple devices in one apparatus or system, so as to have a smaller footprint in a home or small business setting, or to provide centralized document management/distribution/production in the context of, for example, a large-office setting. A typical MFP may provide a combination of some or all of the following capabilities: printer, scanner, photocopier, fax machine, e-mail capability, and so forth. Networked MFDs (Multi-Function Devices) generally interact with an assemblage of varying rendering devices, client computers, servers, and other components that are connected to and communicate over a network.

Diagnostic techniques are generally employed to fix problems in more complex MFDs, and to identify the cause of failure in a machine component from a failure symptom, as well as to predict the occurrence of a particular failure type from pre-failure data. The problems that can be encountered with a fleet of MFDs before an MFD product is launched are often easily observable, repeatable, and diagnosable by an engineering team. Such problems can be repaired utilizing built-in diagnosis tools such as, for example, fault codes, electronic documents, and knowledge base documentation provided in association with the MFDs.

Problems with indirect causes are more difficult to diagnose and repair; however, knowledge of such problems can be gained by a CSE (Customer Service Engineer) who exchanges information anecdotally, or through e-mail, forums, or other general purpose modes of communication. Furthermore, different types of problems may occur in different operating conditions or phases associated with each MFD in an MFD fleet.

Conventional state tracking systems for diagnosing actual, pending, difficult or previously unseen problems involve the provision of data snapshots associated with the MFDs with respect to a relatively infrequent cadence to a back end server, where data are later processed. The relative infrequency of the data may lead to a so-called "Nyquist problem," wherein the state of a device may change many times between data snapshots so that the data do not capture a useful time course for data stream mining. One approach involves acquiring and sending data to the back office systems more frequently or alternatively to store large volumes of data locally and send it in a big data package. Transmitting and processing such enormous amounts of data is bandwidth and computationally intensive, time consuming, and non-specific to the immediate usage profile of the MFDs. Additionally, determining the root causes for such difficult problems is an extremely challenging task.

Based on the foregoing, it is believed that a need exists for an improved distributed data mining system and method for determining the root cause of problems associated with members of an MFD cloud, as described in greater detail herein. In addition, a need exists for solutions involving situations in which a particular machine member of an MFP cloud experiences a particular problem. The cloud itself is robust because of the distributed nature of the cloud. That is, a large fraction of the cloud may fail but the remaining, functional members can sustain the cloud even in the absence of many of its members.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for configuring a multi-function device (MFD), such as a printer, scanner, photocopy machine, fax machine, etc., or a combination thereof.

It is another aspect of the disclosed embodiments to provide for an improved distributed data mining system and method.

It is a further aspect of the disclosed embodiments to provide for an improved method and system for determining the root cause of problems associated with members of an MFD cloud.

The aforementioned aspects and other objectives and advantages can now be achieved as described herein. A distributed data mining system and method for determining the root cause of problems associated with members of an MFD cloud is disclosed. An MFD cloud can be configured to include a fleet of networked MFDs inside an enterprise firewall to perform data analytics in real time. High frequency data snapshots describing the state of each MFD can be captured and stored locally in a storage unit accessible by the MFDs. Alternatively; it may be stored in a distributed file system within the cloud. (The distributed file system provides redundancy, robustness, and access even if some of the constituents of the cloud become unavailable. This is an important aspect of this invention. If the data are all in one place and that one place fails, then any analysis that proposes to use that data will fail and diagnosis will be impossible. With the DFS, the data are always available for analysis.)

The high frequency data snapshots can be acquired on a heartbeat (e.g. a few times a day) and/or in response to a specific event (e.g. severe faults or other specific machine conditions) with a higher cadence and finer granularity. A distributed data mining module associated with the cloud may then periodically analyze the data stored within the cloud to identify actual, pending, previously unknown, and/or difficult to detect problems using the available computational cycles of idle MFDs in the network. Since the data mining module has essentially continuous and gapless data to work on, the algorithms can produce more reliable results. Once a problem is indentified, information (probably in abstracted form rather than raw data) associated with such problems can then be securely transmitted to a back-end unit for verification and to propagate knowledge of the root cause(s) of the problems more rapidly. The solutions with respect to such problems can be shared, for example, throughout a service organization using existing communication methods (person-person, capture in a knowledgebase, presented in periodic forum meetings, and forwarded to the machine designers for correcting design issues and improving future products.)

The MFD cloud may include other devices (e.g. laptops, desktops, servers, network devices, palmtops, mobile phones, etc) as a service provider. Data analytics can be performed utilizing the available computational cycles of the idle MFDs and without interrupting the continuity of the device operation. The MFD may also collect a snapshot of a current state in response to certain triggers (e.g. doors opened/closed, supply levels depletion, electrical contacts are broken, power off/on, etc.) and whenever a service and repair is performed by a CSE (Customer Service Engineer) in addition to the regular "heartbeat" interval. Each MFD associated with the cloud may collect a continuous set of data immediately before and after the multi-function device is serviced. A distributed data mining module analyzes the MFDs with enhanced performance to provide essential data for optimizing the fleet performance.

Diagnostic data has a decreasing time value—this means that the older data becomes less relevant to current or future problems. In order to reduce the storage requirements for the cloud, high frequency data considered old and irrelevant can be discarded after a particular interval of time. This leaves room for the detailed historical "pre-fail' data to determine trends leading to failure.

In general, the terms and conditions of a customer's contract may change what a vendor is willing to do to maintain a customer's machine. Certain functionality can be disabled if customers did not pay for certain features. Each customer's usage of a machine will be different. The disclosed approach is based on a hypothesis that a customer's usage patterns are determinative in how a machine behaves from a failure standpoint, which is why the analysis described herein can be performed locally. While the whole machine population may have similar behaviors, individual machines are likely to possess a uniqueness that can be masked by including it in a general population.

The back end unit may permit the collected data and the solutions attained locally to be correlated with the data collected from various MFD clouds. If a correlation is ascertained and verified, it may then be propagated throughout a service organization, for example, so that the solution can be shared with the CSE. Additionally, the data may also be propagated throughout the fleet computationally and included in the occurrences of interest that the machines can detect. The data may also be securely transmitted whenever the data is moved outside of a firewall.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
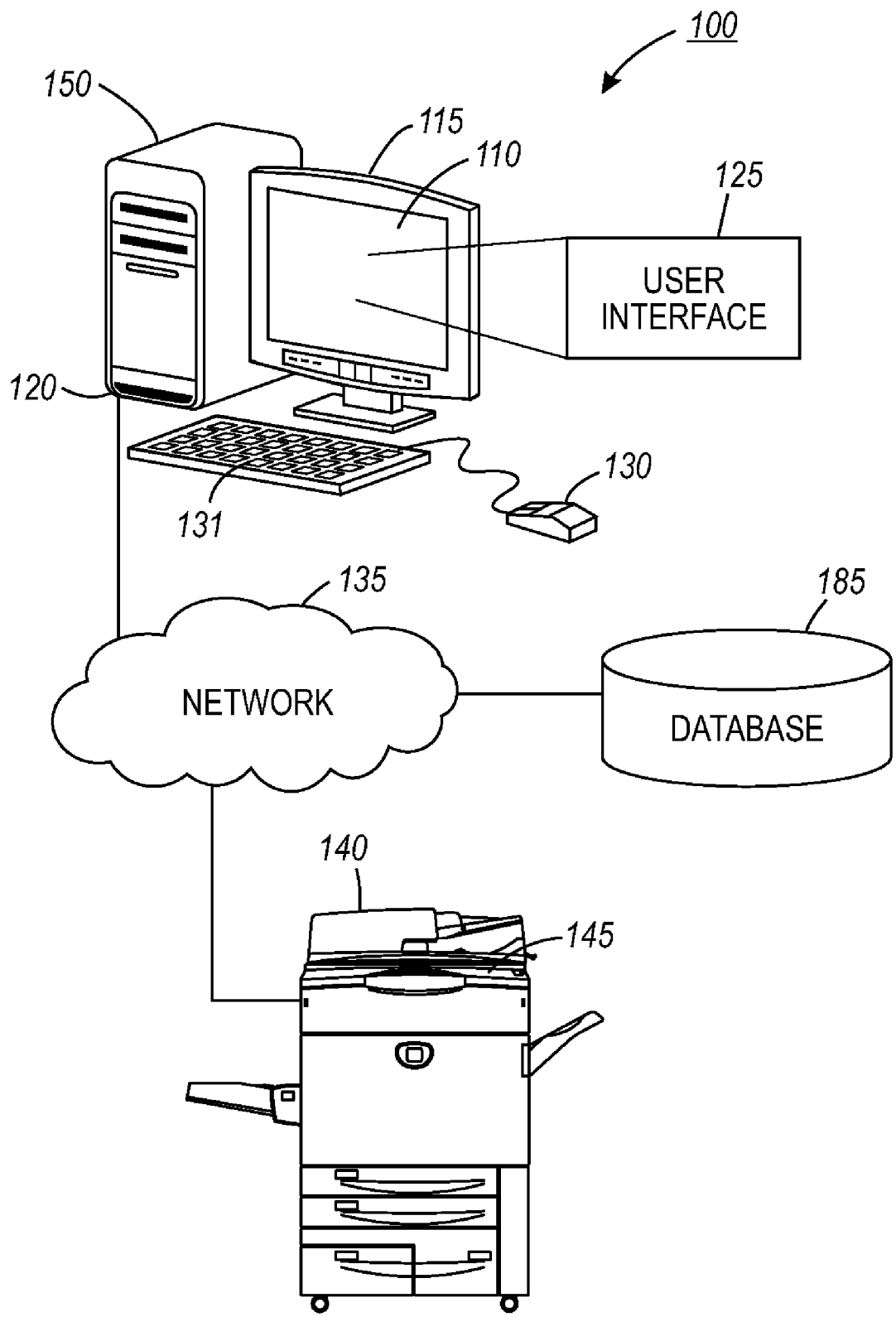
FIG. 1 illustrates an example of an MFD coupled to a data-processing apparatus through a network, in accordance with the disclosed embodiments.

FIG. 1 is provided as an exemplary diagram of data processing environments in which embodiments of the present invention can be implemented. It should be appreciated that FIG. 1 is only exemplary and is not intended to assert or imply any limitation with regard to the environments in which aspects or embodiments of the present invention can be implemented. Many modifications to the depicted environments can be made without departing from the spirit and scope of the present invention.

Referring to FIG. 1, system 100 includes a multi-function device 140 coupled to a data-processing apparatus 110 through a network 135. The data-processing apparatus 110 can be, for example, a personal computer or other computing device, and generally includes a central processor 120, a display device 115, a keyboard 131, and a pointing device 130 (e.g., mouse, track ball, pen device, or the like). Additional input/output devices, such as the multi-function device 140 can be included in association with the data-processing apparatus 110 as desired.

Note that as utilized herein, the term multi-function device (including the acronym MFD) may refer to an apparatus or system such as a printer, scanner, fax machine, copy machine, etc., and/or a combination thereof. Preferably, MFD 140 is capable of multiple rendering functions such as printing, copying, scanning, faxing, etc. In some embodiments, MFD 140 can be implemented with a single rendering function such as printing. In other embodiments, MFD 140 can be configured to provide multiple rendering functions, such as scanning, faxing, printing and copying. Note that the MFD's 142 and 144 described in greater detail herein are analogous or similar to MFD 140.

A non-limiting example of an MFD that can be utilized as MFD 140, 142 and/or 144 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of an MFD that can be utilized as MFD 340, 342 and/or 344 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of an MFD that can be utilized as MFD 340, 342 and/or 344 is disclosed in U.S. Pat. No. 5,920,405, entitled "Multifunction Device with Printer Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn.

Network 135 may employ any network topology, transmission medium, or network protocol. Network 135 may include connections, such as wire, wireless communication links, or fiber optic cables. The MFD 140 includes a user interface 145, such as a panel menu. The panel menu can be employed to select features and enter other data in the MFD 140. Such interfaces may include, for example, touch screens having touch activated keys for navigating through an option menu or the like.

A MFD driver program can be installed on the data-processing apparatus 110 and can reside on the host device's hard drive 150. The MFD driver program can be activated through an application interface so that a user may generate a print job with the MFD driver for processing by the MFD 140. The data-processing apparatus 110 also includes a GUI 125 for communicating MFD features for processing, for example, a print job to a user and accepting the user's selection of available MFD features. The user interface 125 displays information and receives data through device display and/or the keyboard/mouse combination. The interface 125, also serves to display results, whereupon the user may supply additional inputs or terminate a given session. The data-processing apparatus 110 can be, for example, any computing device capable of being integrated within a network, such as a PDA, personal computer, cellular telephone, point-of-sale terminal, server, etc.

Note that the user interface as utilized herein generally refers to a type of environment that represents programs, files, options and so forth by means of graphically displayed icons, menus, and dialog boxes on a screen. The input device of the multi-function devices 140, 142 and 144 can be a local user interface, such as a touch-screen display or separate keypad and display or a memory fob or the like as discussed above. Alternatively or additionally, the input device can be a wireless port that receives a wireless signal containing constraint data from a portable device. The wireless signal can be an infrared or electromagnetic signal. A system administrator may input constraint data through the local user interface by manipulating the touch screen, keypad, or communicating via wireless messages through the wireless port. The administrator's portable device that communicates wirelessly can be a personal digital assistant (PDA), or the like, as noted above.

The following description is presented with respect to embodiments of the present invention, which can be embodied in the context of a data-processing apparatus 110 and MFD 140 depicted in FIG. 1. The present invention, however, is not limited to any particular application or any particular environment. Instead, those skilled in the art will find that the system and methods of the present invention can be advantageously applied to a variety of system and application software, including database management systems, word processors, and the like. Moreover, the present invention can be embodied on a variety of different platforms, including Macintosh, UNIX, LINUX, and the like. Therefore, the description of the exemplary embodiments, which follows, is for purposes of illustration and not considered a limitation.

Figure 2:
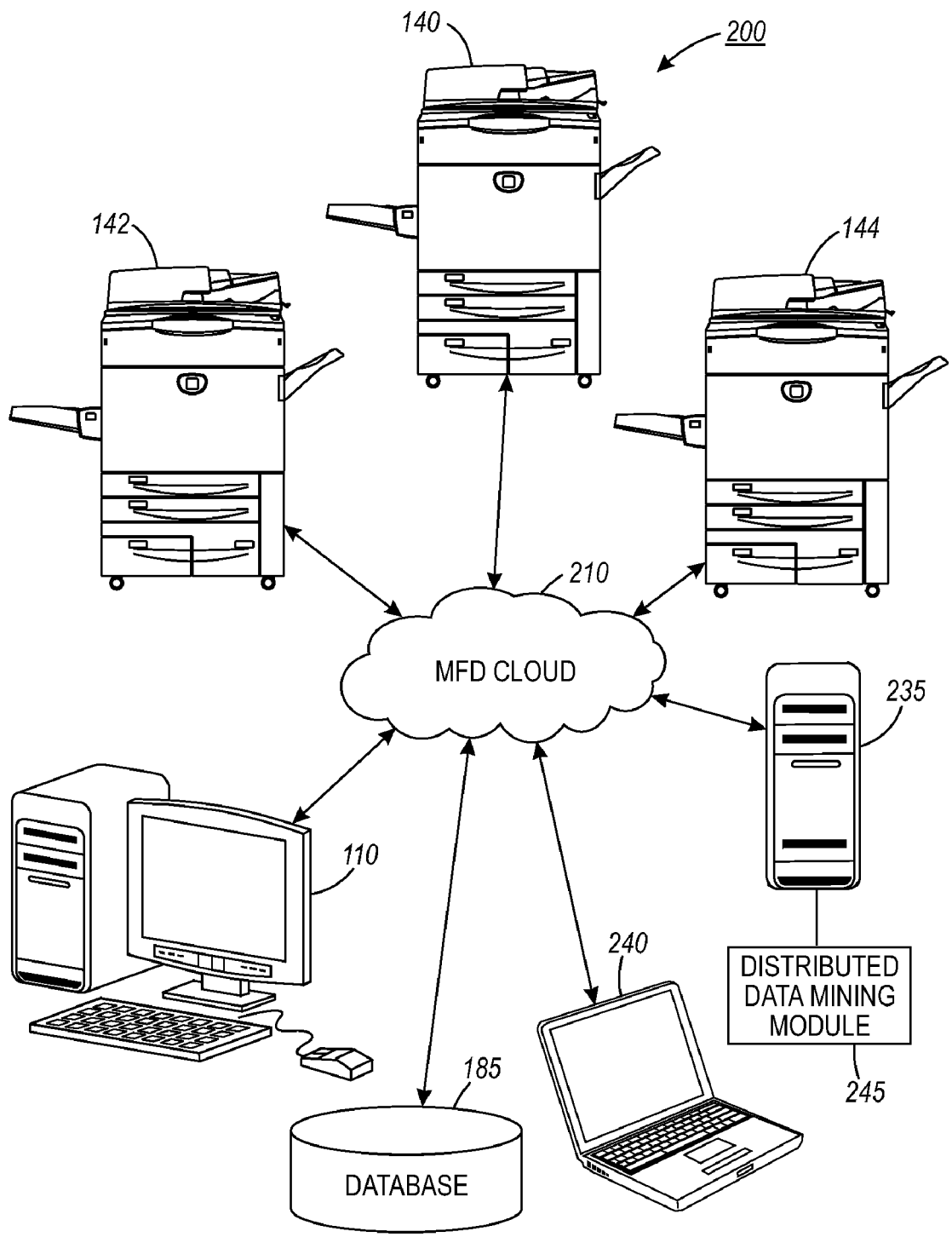
FIG. 2 illustrates a graphical representation of a distributed data mining system associated with a MFD cloud, in accordance with the disclosed embodiments.

FIG. 2 illustrates a graphical representation of a distributed data mining system 200 associated with an MFD cloud 210, in accordance with the disclosed embodiments. Note that in FIGS. 1-4, identical or similar blocks are generally indicated by identical reference numerals. The distributed data mining system 200 generally includes a cloud infrastructure 210 associated with one or more multi-function devices 140, 142 and 144, data-processing system 110, laptops 240 and servers 235. Data-processing system 110 depicted in FIG. 1 can be, for example, a server. Other devices such as, for example, desktops, network devices, palmtops, mobile phones, etc may also be included in the cloud infrastructure 210, as service providers. The multi-function devices 140, 142 and 144 can be located remotely with respect to each other, or alternatively, they can be located locally with respect to each other.

As used herein, the term "cloud" can refer to a collection of resources (e.g., hardware, data and/or software) provided and maintained by an off-site or off-premise party (e.g., third party), wherein the collection of data and resources can be accessed by an identified user via a network. Note that an example of such a "cloud" based system and/or network is disclosed in U.S. Patent Application Publication No. 20070260716, entitled "Method and System for Collaborative Self-Organization of Devices," which was published to Gnanasambandam, et al on Nov. 8, 2007 and is incorporated herein by reference.

In general, the resources can include data storage services, data processing services (e.g., applications), and many other services that are conventionally associated with and resident within personal computers or local or 'on-premise' servers. In general, cloud computing can be employed to perform services in a dissociative way i.e., the client may not know where the service is performed as long as the service is performed with the expected quality of service. Cloud computing can be employed to solve "grid" scale problems that may require an inordinate amount of time and resources for a single computer to solve. For example, in cloud computing mining large amounts of data from the fleet of MFDs 140, 142 and 144 can be broken into much smaller pieces that are executed in parallel, and the results can be combined at the end. A preferred embodiment involves utilizing the computational resources of the functional members of the cloud when they are otherwise idle to perform distributed data mining activities and make use of the empty space on their respective disk drives for a distributed file system.

The MFD can be, for example, an office machine, which incorporates the functionality of multiple devices in one, so as to provide centralized document management, document distribution and production in a large-office setting and the like. The typical MFD may act as a combination of a printer, scanner, photocopier, fax and e-mail. While three multi-function devices 140, 142 and 144 are shown by way of example, it is to be appreciated that any number of rendering devices can be linked to the network, such as two, four, six or more rendering devices. In general, the multi-function devices 140, 142 and 144 can be employed to perform a rendering output function (e.g., printing, scanning, copying, faxing, etc) within a networked environment. Note that multi-function devices 140, 142 and 144 are generally analogous to one another.

Each MFD 140, 142 and 144 in the enterprise fleet may collect its own data and store a persistent history associated with the data locally on a distributed database 185 accessible by the MFDs 140, 142 and 144. The database 185 can be localized in a single location or preferably distributed among the members of the cloud for robustness sake. Note that the distributed database 185 can be configured in some embodiments as a database that is under the control of a central database management system (DBMS) in which storage devices are not all attached to a common CPU. It can be stored in multiple computers located in the same physical location, or can be dispersed over a network of interconnected computers, depending upon design considerations. The distributed database 185 can constitute, for example, a DFS (Distributed File System).

The data may ideally be collected on a configurable "heartbeat" several times per day with a much higher cadence and finer granularity. In addition to the regular heartbeat interval, the MFDs 140, 142 and 144 may also collect a snapshot of its current state in response to certain triggers, such as severe faults or other specific machine conditions (e.g. doors opened/closed, supply levels depletion, electrical contacts on CRUs are broken, power off/on, etc.), or whenever service and repair is performed by a CSE which can be indicated when the machine enters into a diagnostics mode.

The service actions can be employed as an event tag for data collection. For example, whenever service or repair is performed on the machine with respect to MFDs 140, 142 and 144 the most recent data can be tagged to indicate that the machine is "sick." Another snapshot can be taken as soon as the MFDs 140, 142 and 144 are serviced (ideally initiated by the CSE/operator as part of the service). Note that the "service and repair" refers not only to major repairs and service, but also relatively innocuous daily maintenance such as supplies replenishment or the clearing of paper jams.

Each MFD 140, 142 and 144 associated with the cloud 210 may collect a continuous set of data regarding the ever changing state of the MFD 140, 142 and 144, with particular attention paid to the data immediately before and after the "sick" machine is returned to a healthy state. The reason for such an approach is to determine whether the symptoms that preceded the repair action can be utilized to predict what that repair action performed. Armed with this knowledge, advice can be provided, for example, to the service person about what to do and reduce on-site diagnostic time. If the repair actions can be performed by a willing customer, the Call Center can advise the customer to perform such actions and avoid an expensive and time consuming service person visits. This also brings the machine back to availability quickly and avoids down time associated with service person travel and repair time.

The data that are considered old or irrelevant can be discarded after some interval of time, but detailed historical "pre-fail' data can be retained in the distributed database 185 to find trends leading to failure. Note that a proxy device may also be included in the cloud 210 to collect data with respect to the MFDs 140, 142 and 144. A platform such as a device manager can be employed to collect the MFDs 140, 142 and 144 state data over the network 210 and store the data on the server 235. Such an approach permits data from the MFDs 140, 142 and 144 that are otherwise unable to participate in the cloud (e.g. smaller devices, legacy devices, devices without the required disk space, etc.).

A distributed data mining module 245 running within the MFD cloud 210 may then continuously mine the data stored within the cloud 210 to search for difficult to detect problems once the MFDs 140, 142 and 144 in the fleet collects data. Note that one non-limiting example of a distributed data mining approach that can be utilized to implement the distributed data mining module 245 is disclosed U.S. Pat. No. 6,687,693, entitled "Architecture for distributed relational data mining systems," which issued to Cereghini, et al on Feb. 3, 2004 and is incorporated herein by reference. Another non-limiting example of a distributed data mining approach that can be utilized to implement the distributed data mining module 245 is disclosed U.S. Pat. No. 6,865,582, entitled "Systems and methods for knowledge discovery in spatial data," which issued to Obradovic, et al on Mar. 8, 2005 and is incorporated herein by reference. Another non-limiting example of a distributed data mining technique that can be utilized to implement the distributed data mining module 245 is disclosed in U.S. Patent Application Publication No. 20070100851, entitled "System and method for collaborative analysis of data streams," which published on May 3, 2007 by Gene Golovchinsky et al, and is assigned to Fuji Xerox Co., Ltd. Note that U.S. Patent Application Publication No. 20070100851 is also incorporated herein by reference.

Note that as utilized herein, the term "module" may refer to a physical hardware component and/or to a software module. In the computer programming arts, such a software "module" can be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module can be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as floppy disks, hard disk drives, CD/DVD ROMs, etc., and transmission media, such as digital and/or analog communication links. Examples of transmission media can also include devices such as modems, which permit information to be transmitted over standard telephone lines and/or the more advanced digital communications lines.

The distributed data mining module 245 separates the mining problem into pieces that can be executed on separate pieces of hardware within a cloud or network. The distributed data mining module 245 does not reside in a single location, but leverages the presence of many computational resources in the cloud and utilizes such computational resources to speed the analysis, including, for example, mathematical calculations and computational correlations.

In some embodiments, the data mining module 245 can be hosted on any number of nodes within the MFD cloud 210. The data mining module 245 may continuously analyze the data stored within the cloud 210 utilizing an available computational cycle that utilizes the computational resources of MFDs that are not doing anything at the moment. Note that a common term that can be utilized herein refers to the computation "cycles" available on idle machines. The data mining module 245 is capable of mining the lengthy history of data that each MFD 140, 142 and/or 144 retains utilizing computational resources from the MFD cloud 210 to detect problems. The probability of detecting such problems may increase with the amount of data collected and made available for mining. The data mining module 245 pay special attention to the "sick" devices that have been serviced and repaired, particularly those devices with similar problems or faults. The data mining module 245 may also find devices with better than expected performance, such as a longer than expected mean time between failures. The data mining module 245 may also mine devices that perform above expectations to potentially provide essential data for optimizing fleet performance by configuring poorly performing devices to function as MFDs with above-average performance.

Figure 3:
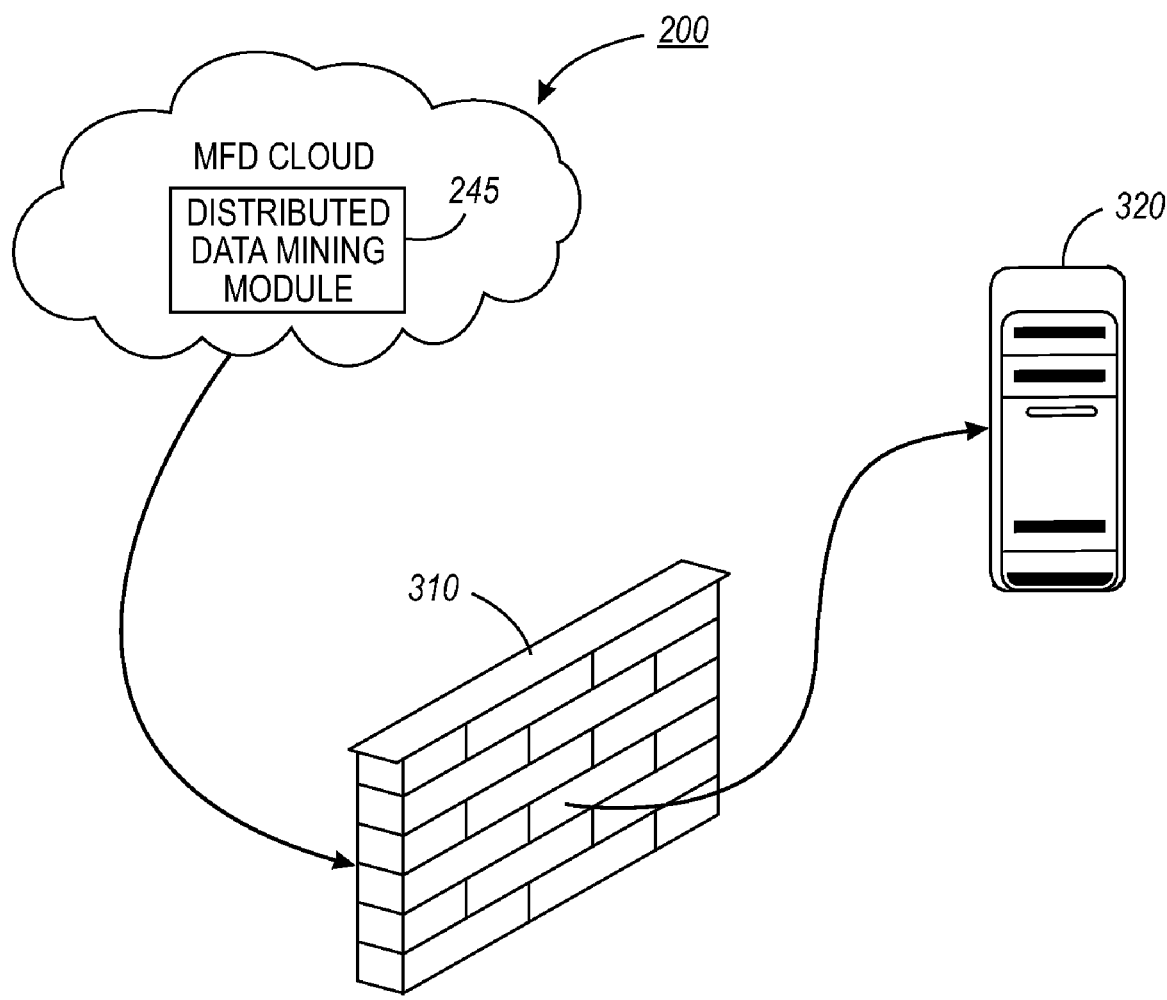
FIG. 3 illustrates a block diagram of the distributed data mining system associated with a back-end unit, in accordance with the disclosed embodiments.

FIG. 3 illustrates a block diagram of the distributed data mining system 200 associated with a back-end unit 320, in accordance with the disclosed embodiments. The data associated with the difficult to detect problem can be securely transmitted frequently to the back-end unit 320 to determine root cause of the problems more rapidly so that they can be shared throughout a service organization. Note, however, that such a configuration does not involve the bulk transmission of data to a Back Office. This is exactly what we are trying to avoid. Instead, the embodiments discussed herein involve the transmission of the results of the data mining analysis to the Back Office for verification and propagation.

The data mining module 245 may run inside an enterprise firewall 310 and analyze the data generated by the MFD cloud 210. The data mining module 245 may also find problems that are specific to a customer on a continuous basis. The data mining module 245 transmits the data to the back-end unit 320 if the problems, either positive or negative, are discovered. The results of the data mining can be transmitted as frequently as possible, and the data transmitted can be abstract (as opposed to containing the detailed data) and also stripped of identifying information to preserve the security and integrity of the customer. A user may "opt in" via the terms and conditions when a service agreement is established for the MFD cloud 210 to securely transmit the data.

The data mining module 245 also examines the specific customer on a continuous basis and the content and specificity of the data analysis and transmission can be based on the terms and conditions. The large volume data storage can be reduced and the transmissions containing only the relevant information to the occurrence of interest can be sent. At the back-end unit 320, the data with respect to the problems can be combined with the data from across the global fleet, and examined by knowledgeable experts to determine whether the trends represent a real correlation with problems in the field. If such a correlation is found and verified it can then be propagated throughout the service organization so that the solution can be shared with the CSEs and welcome center employees and may put it to use immediately Additionally, the data can also be propagated throughout the fleet computationally and included in the occurrences of interest that machines can detect. Note, for example, that Xpresso, DMTF, and edge host implementations can be easily extensible to accommodate such a feature. A non-limiting example of an implementation that can be extensible to accommodate such a feature is disclosed in U.S. Patent Application Publication No. 20040128669, entitled "Apparatus for low cost embedded platform for device-side, distributed services enablement," which was published by Furst, et al. on Jul. 1, 2004 and is incorporated herein by reference. Another example is disclosed in U.S. Patent Application Publication No. 20040128375, entitled "Integrated server platform for the autonomous provisioning of device services," which published on Jul. 1, 2004 by Ronald M. Rockwell and is incorporated herein by reference. A further example is disclosed in U.S. Patent Application Publication No. 20040111315, entitled "Device Model Agent," which published on Jun. 10, 2004 by Naveen Sharma, et al., and is incorporated herein by reference.

In general, such an implementation permits code download to devices for execution thus, new algorithms can be readily deployed to selected populations for testing before expansion of the trial to the whole population. Also, selecting classes of objects for transmission can be readily accomplished because objects are modeled at the device. Thus, with individual machine granularity, specific algorithms can be provisioned and the set of data classes for transmission can be specified in order to monitor performance and behavior of the algorithms.

For example, when a machine associated with the MFD is "sick" often the processor, drives, and network are still functioning. The machine may call for cloud assistance, or may use its spare cycles in a more dedicated mode to assist the cloud with the assessment. The cloud 210 may choose to seek assistance (in the form of additional data or existing abstractions) from a larger population by contacting the back-end unit 320 and inquiring whether there are other sets of machines that have experienced symptoms similar to the ones currently being experienced by the local device requesting help.

In accordance with the disclosed embodiments, the cloud 210 can also provide clues to the CSE by indicating that the "sick" machine is behaving like other machines that were previously sick and repaired, even if the specific cause and solution cannot be determined by the system 200. The affected device and the cluster can provide symptoms to a back office diagnostic server and request diagnostic assistance in the form of additional diagnostic routines for download and execution, return of results, and remote remediation suggestions. Additionally, the computational system 200 can interact with human systems with information on diagnosis and repair suggestions which can be injected into the traditional service delivery value chain. Additionally, the system 200 may permit free exchange of data between the MFDs 140, 142 and 144 via the network (to facilitate mining) and the installation of a distributed data mining module 245 within or in association with the MFD cloud 210.

Figure 4:
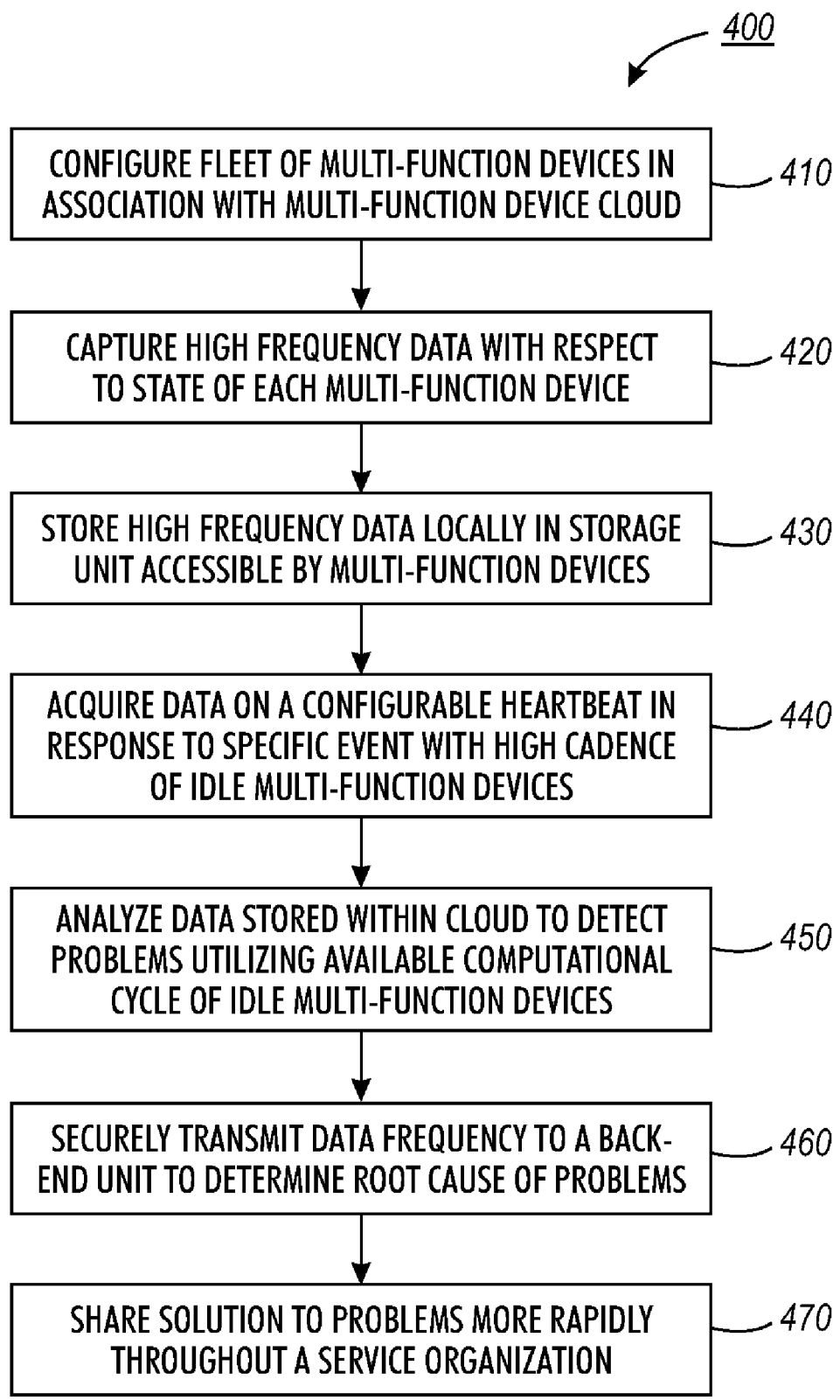
FIG. 4 illustrates a high level flow chart of operation illustrating logical operation steps of a method for determining root cause of problems associated with a MFD cloud, in accordance with the disclosed embodiments.

FIG. 4 illustrates a high level flow chart of operation illustrating logical operation steps of a method 400 for determining root cause of problems associated with the fleet of MFDs 140, 142 and 144, in accordance with the disclosed embodiments. The MFD cloud 210 can be configured to include the fleet of networked MFDs 140, 142 and 144 in association with the enterprise firewall 310 to perform data analytics in real time, as indicated at block 410. The high frequency data with respect to a state of each MFD 140, 142 and 144 can be captured and stored locally in the virtual file unit 185 accessible by the MFDs 140, 142 and 144, as depicted at blocks 420 and 430. The data can be acquired on a configurable heartbeat in response to a specific event with a much higher cadence and finer granularity, as illustrated at block 440.

Thereafter, the data stored within the cloud 210 can be continuously analyzed by the distributed data mining module 245 to identify actual, pending, previously unknown, and difficult to detect problems utilizing the available computational cycles of idle MFDs 140, 142 and 144 in the network, as indicated at block 450. The analysis associated with the problems can be securely transmitted to the back-end unit 320 to verify and propagate the root cause of problems more rapidly, as depicted at block 460. The solution to the problems can be shared throughout a service organization, as illustrated at block 470. Note that it is the identification of the root cause of the problem that has the most financial leverage here. That is, it is the connection between the machine state data and the root cause of problems that is sought through the distributed data mining activities described herein. That connection is also the content being verified and propagated, as indicated herein.

While the present invention has been particularly shown and described with reference to a preferred embodiment, it will be understood by those skilled in the art that various changes in form and detail can be made therein without departing from the spirit and scope of the invention. Furthermore, as used in the specification and the appended claims, the term "computer" or "system" or "computer system" or "computing device" includes any data processing system or apparatus including, but not limited to, personal computers, servers, workstations, network computers, main frame computers, routers, switches, Personal Digital Assistants (PDA's), telephones, and any other system capable of processing, transmitting, receiving, capturing and/or storing data. Thus, the data-processing apparatus 110 depicted in FIG. 1, for example, may equally be implemented as PDA, cellular telephone, Smartphone, laptop computer, iPhone, Blackberry type device as well as other types of personal or desktop computers.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for determining the root cause of problems of members in a fleet of multi-function devices, comprising:
   capturing high frequency data with respect to a state of a multi-function device associated with a multi-function device cloud in order to thereafter store said data in a database accessible by said multi-function device, by executing a program instruction in a data-processing system;
   acquiring said high frequency data in association with a configurable heartbeat and in response to at least one event with a high cadence and fine granularity, by executing a program instruction in a data-processing system; and
   periodically and frequently analyzing said high frequency data stored in association with said multi-function device cloud utilizing a distributed data mining module to rapidly determine a root cause of at least one difficult to detect problem, wherein said distributed data mining module is associated with said multi-function device cloud, by executing a program instruction in a data-processing system.

2. The method of claim 1 further comprising configuring said database as a distributed file system, by executing a program instruction in a data-processing system.

3. The method of claim 1 further comprising configuring said multi-function device cloud to include a plurality of networked multi-function devices in association with an enterprise firewall to perform data analytics in real time, by executing a program instruction in a data-processing system.

4. The method of claim 1 further comprising analyzing said high frequency data utilizing a computational cycle associated with an idle multi-function device in said multi-function device cloud without interrupting a continuity of operation of said multi-function device, by executing a program instruction in a data-processing system.

5. The method of claim 1 further comprising sharing a solution concerning said at least one difficult to detect problem throughout a particular organization, by executing a program instruction in a data-processing system.

6. The method of claim 1 further comprising analyzing said high frequency data associated with said multi-function device before and after said multi-function device is serviced, by executing a program instruction in a data-processing system.

7. The method of claim 1 further comprising analyzing said high frequency data associated with said multi-function device with an enhanced performance to generate data for optimizing a performance of said plurality of multi-function devices, by executing a program instruction in a data-processing system.

8. The method of claim 1 further comprising discarding said high frequency data that are irrelevant after a particular period of time, by executing a program instruction in a data-processing system.

9. The method of claim 1 further comprising:
   examining said high frequency data generated by said multi-function device associated with a specific customer on a continuous basis to derive examination/analysis results thereof, by executing a program instruction in a data-processing system; and
   transmitting said examination/analysis results of said high frequency data associated with said at least one difficult-to-detect problem based on terms and conditions established at a commencement of a service agreement, by executing a program instruction in a data-processing system.

10. The method of claim 1 further comprising:
    correlating said high frequency data and said solution reached locally with data collected from a plurality of multi-function device clouds in other locations to derive a correlation thereof, by executing a program instruction in a data-processing system; and
    utilizing said correlation to verify and propagate results obtained from said correlation, by executing a program instruction in a data-processing system.

11. A system for determining the root cause of problems of members in a fleet of multi-function devices, said system comprising:
    a processor:
    a data bus coupled to said processor; and
    a computer-usable medium embodying computer code, said computer-usable medium being coupled to said data bus, said computer program code comprising instructions executable by said processor and configured for:
    capturing high frequency data with respect to a state of a multi-function device associated with a multi-function device cloud in order to thereafter store said data in a database accessible by said multi-function device;
    acquiring said high frequency data in association with a configurable heartbeat and in response to at least one event with a high cadence and fine granularity; and
    periodically and frequently analyzing said high frequency data stored in association with said multi-function device cloud utilizing a distributed data mining module to rapidly determine a root cause of at least one difficult to detect problem, wherein said distributed data mining module is associated with said multi-function device cloud.

12. The system of claim 11 wherein said instructions are further configured for configuring said database as a distributed file system.

13. The system of claim 11 wherein said instructions are further configured for configuring said multi-function device cloud to include a plurality of networked multi-function devices inside an enterprise firewall to perform data analytics in real time.

14. The system of claim 11 wherein said instructions are further configured for analyzing said high frequency data utilizing a computational cycle associated with an idle multi-function device in said multi-function device cloud without interrupting a continuity of operation of said multi-function device.

15. The system of claim 11 wherein said instructions are further configured for sharing a solution concerning said at least one difficult to detect problem throughout a particular organization.

16. The system of claim 11 wherein said instructions are further configured for analyzing said high frequency data associated with said multi-function device before and after said multi-function device is serviced.

17. The system of claim 11 wherein said instructions are further configured for:
- analyzing said high frequency data associated with said multi-function device with an enhanced performance to generate data for optimizing a performance of said plurality of multi-function devices; and
- discarding said high frequency data that are irrelevant after a particular period of time.

18. The system of claim 11 wherein said instructions are further configured for:
- examining said high frequency data generated by said multi-function device associated with a specific customer on a continuous basis to derive examination/analysis results thereof; and
- transmitting said examination/analysis results of said high frequency data associated with said at least one difficult-to-detect problem based on terms and conditions established at a commencement of a service agreement.

19. The system of claim 11 wherein said instructions are further configured for:
- correlating said high frequency data and said solution reached locally with data collected from a plurality of multi-function device clouds in other locations to derive a correlation thereof; and
- utilizing said correlation to verify and propagate results obtained from said correlation.

* * * * *